(No Model.) 2 Sheets—Sheet 2.

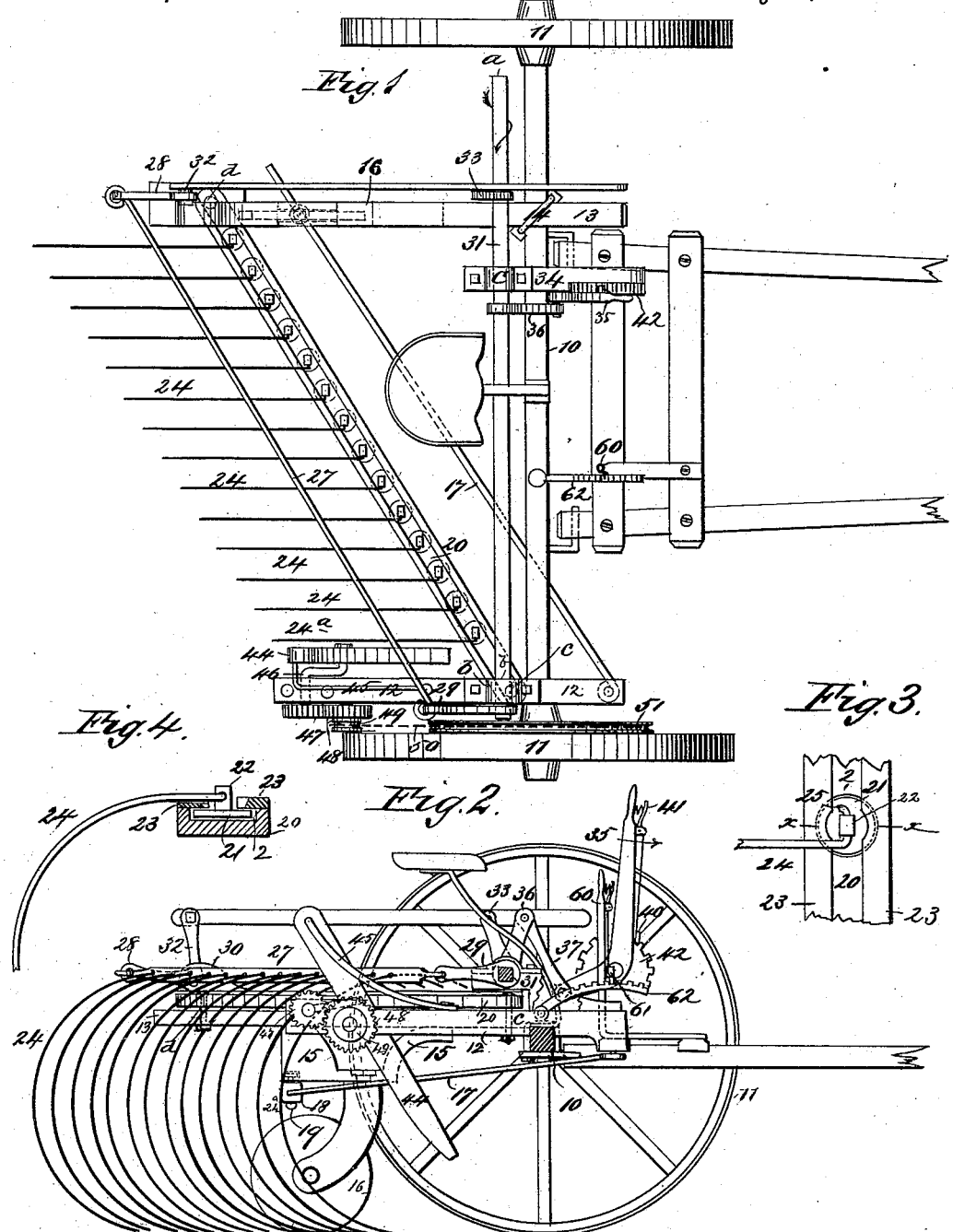

J. H. BALLY.
HORSE HAY RAKE.

No. 382,067. Patented May 1, 1888.

WITNESSES:
F. McArdle.
C. Sedgwick

INVENTOR:
J. H. Bally
BY Munn & Co.
ATTORNEYS.

UNITED STATES PATENT OFFICE.

JULIUS H. BALLY, OF PARADISE HILL, OHIO.

HORSE HAY-RAKE.

SPECIFICATION forming part of Letters Patent No. 392,067, dated May 1, 1888.

Application filed November 28, 1887. Serial No. 256,319. (No model.)

*To all whom it may concern:*

Be it known that I, JULIUS H. BALLY, of Paradise Hill, in the county of Ashland and State of Ohio, have invented a new and Improved Hay-Rake, of which the following is a full, clear, and exact description.

This invention relates to rakes, the main object of the invention being to provide a rake which will act to gather the hay and discharge it in a line parallel with the line of travel of the machine and at right angles to the axle of the machine; and to this end the invention consists in the improvements in rakes the teeth of which operate at an angle to the axle instead of in a line parallel therewith, which will be hereinafter more fully described, and specifically pointed out in the claims.

Reference is to be had to the accompanying drawings, forming a part of this specification, in which similar figures of reference indicate corresponding parts in all the views.

Figure 5:
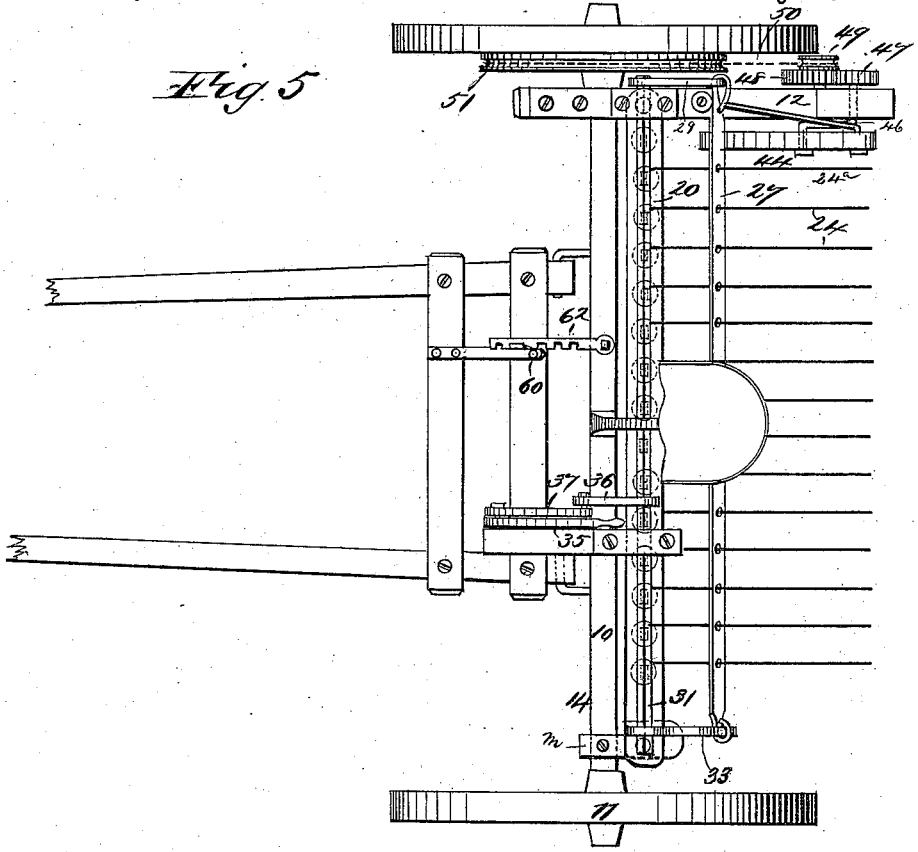
Figure 6:
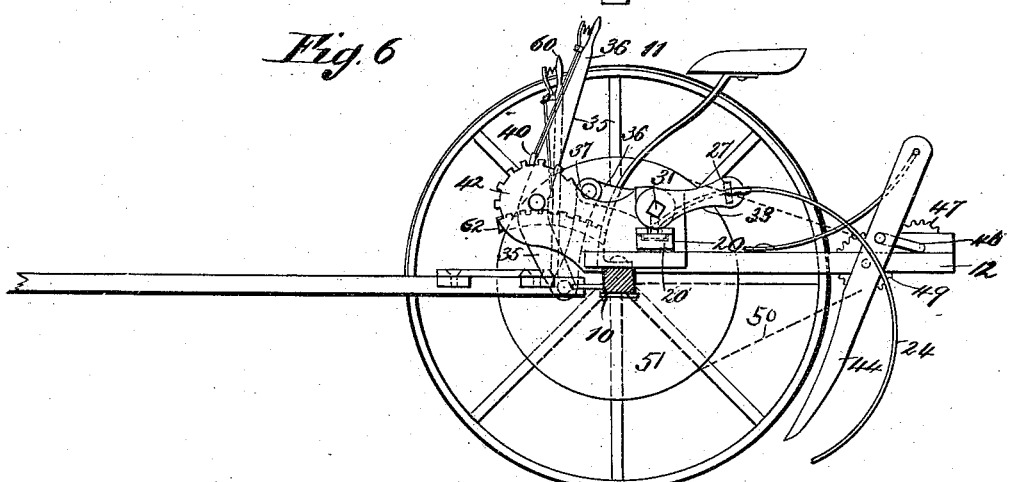

Figure 1 is a plan view of my improved form of rake. Fig. 2 is a sectional view taken upon a line just within the right-hand wheel of the machine. Fig. 3 is a detail view illustrating the connection between the teeth and the rake-head. Fig. 4 is a cross sectional view taken on line $x\ x$ of Fig. 3. Fig. 5 is a plan view of the rake, representing it as it appears when adjusted for use as an ordinary dump-rake; and Fig. 6 is a sectional view taken on a line just within the left-hand wheel of the machine.

Referring now more particularly to the construction illustrated in Figs. 1, 2, and 3, 10 is the axle of the machine, which is provided, as usual, with wheels 11, said wheels being loosely mounted upon the axle. At a point near one end of this axle I permanently connect a rearwardly-extending cross-bar, 12, and at the opposite side of the machine I adjustably mount a rearwardly-extending cross-bar, 13, said bar being connected to the axle by a clip, 14, and to the under side of the bar 13, I connect the bracket 15 of a caster-wheel, 16, the bracket 15 being simply bolted to the bar 13. A rearwardly-extending brace, 17, is pivotally connected to the forward end of the bar 12. The other end of this brace 17 passes through a stud, 18, that is swiveled to the under side of the bracket 15, the brace being held within the stud by a set screw, 19; or any other proper connection between the brace and the bracket could be employed. One end of the rake head 20 is connected to the cross-bar 12 by a pivot pin or bolt, $c$, while the other end of the rake-head is pivotally connected to the rear end of the cross-bar 13 by a bolt, $d$. In the upper face of the rake-head there are formed a number of circular recesses, 2, (see Fig. 3,) and in these recesses there are fitted circular plates 21, that are formed with upwardly-extending projections 22, the plates 21 being held within their recesses by strips 23, that are secured to the upper face of the rake-head.

The rake teeth 24 are formed with short arms, 25, which extend at right angles to the main bodies of the teeth, and these arms pass through apertures formed in the projections 22, the arrangement being such that the teeth will extend to the rear from the rake-head in substantially the same planes irrespective of the position of the rake-head—that is, whether the rake-head be adjusted to the position in which it is shown in Fig. 1 or moved up to the position in which it is shown in Fig. 5.

The lift-bar 27, through which the rake-teeth 24 pass, is connected at each end to levers 28 and 29, the lever 28 being a bell-crank lever, and being connected to a bracket, 30, that is carried by the bar 13, while the lever 29 is rigidly connected to a crank-shaft, 31, which is mounted in proper bearings, $b$ and $c$, that are carried, respectively, by the cross-bar 12 and a bracket, 34, that is supported by the axle 10, the upwardly-extending arm 32 of the lever 28 being connected to a lever-arm, 33, that is carried by the shaft 31, said lever-arm 33 being mounted to turn with the shaft 31, but being engaged so that it may be adjusted toward or from the end $a$ of said shaft. The shaft 31 is turned by means of a hand lever, 35, that is pivotally connected to the bracket 34 and to a lever, 36, carried by the shaft 31, by means of a link, 37. The lever 35 is held in any position to which it may be adjusted by a locking-bolt, 40, which is controlled by a thumb-latch, 41, said bolt engaging with a segmental rack, 42, that is carried by the bracket 34, the arrangement being such that when the lever 35 is thrown in the direction of the arrow shown in connection therewith the shaft 31 will be turned in the direction of its arrow, and the lift-bar 27 will be depressed to a position so that the teeth 24 will be forced to bear against the ground.

To prevent the accumulation and dragging of hay upon the right-hand tooth, 24ª, I mount a kicker, 44, just inside of the cross-bar 12, the upper end of said kicker being supported by a bracket, 45, while a reciprocating motion is imparted to the kicker by means of a crank, 46, which is journaled at the rear end of the cross-bar 12, said crank being provided with a gear, 47, that is engaged by a larger gear, 48, said gear 48 being studded to the bar 12. In connection with the gear 48, I arrange a chain or sprocket wheel, 49, over which there passes a chain, 50, which also runs in engagement with a large sprocket or chain wheel, 51, that is carried by the right-hand wheel of the machine, the arrangement being such that as the machine advances the kicker will be operated so that it will act to clear the tooth 24ª.

The rake above described will act to gather the hay and discharge it upon the left-hand side of the machine in a windrow that is parallel with the line traveled by the machine, the windrow consequently being at right angles to the axle of the machine, and in practice it will be found that with heavy green hay it is better to have as great an angle between the axle and the rake-head as is possible; but with lighter hay this angle may be reduced.

By arranging for the discharge of the gathered hay in a windrow that is parallel to the path traveled by the rake I am able to form a continuous windrow prior to the time when all of the hay in the field is cut, so that the stacker or gatherer may follow closely upon the rake; but with the ordinary form of dump-rake this would be impossible, and, in fact, the stacker or gatherer could not be brought into use until all of the field was cut unless the rake was operated by frequently reversing its direction.

It will of course be understood that the bar 12 might be mounted at either side of the machine—that is, instead of being mounted at the right, as shown in Fig. 1, it might be mounted at the left, in which case the discharge would be from the right of the machine.

Although the rake above described is particularly intended for use in the formation of a windrow parallel with the line of travel of the machine, still, if desired, the clip 14 might be loosened and the bar 13 and the parts connected thereto removed, the rake-head being moved forward until it is parallel with the axle, as shown in Figs. 5 and 6, in which position it is supported by a block, m, that is connected to the axle. In this case the rake would be used as an ordinary dump-rake, the dumping being brought about by the lever 35, which lever to dump the load would be thrown in a direction opposite to that of the arrow shown in connection therewith, and when the rake is adjusted as a dump-rake, and as shown in Figs. 5 and 6, it is desirable that the thills or the pole should be locked to the axle, and to this end I provide the thills or the pole with a lever, 60, having a locking-bolt, 61, that engages with a segmental rack, 62, which extends forward from the axle.

Having thus fully described my invention, I claim as new and desire to secure by Letters Patent—

1. The combination, with the axle 10 and its wheels, the rake-head pivotally connected at one end with the axle and adjustable horizontally toward and from the axle at its opposite end, means for said adjustment, and the vertically and laterally swinging teeth connected at their inner ends with said head, of the lift-bar parallel with the rake-head and through bearings in which said teeth freely pass, a rock-shaft, connections between said rock-shaft and the lift-bar for swinging the teeth vertically on the rake-head, and means for operating said rock-shaft, substantially as set forth.

2. The combination, with the axle, its wheels, the rake-head extending obliquely rearward from the axle, a rearwardly-extending cross-bar connecting the outer end of the head with the axle, and the vertically and laterally swinging teeth carried by said rake-head, of a lift-bar parallel with the rake-head and having bearings through which the teeth freely pass, a rock-shaft parallel with the axle, a horizontal lever connecting the inner end of the lift-bar with said rock-shaft, a bell-crank lever on the outer end of said rearwardly-extending cross-bar, the horizontal arm of which is connected to the outer end of the lift-bar, a vertical lever arm on the rock-shaft connected with the vertical arm of the bell-crank lever, and a hand-lever for operating the rock-shaft, substantially as set forth.

3. In a hay-rake, the combination, with the frame, the rake-head secured to the frame and extending obliquely rearward, and the rake-teeth secured thereto, of a vertically and longitudinally rocking kicker mounted on the frame and adjacent to the inner end tooth, 24ª, and means for operating said kicker, substantially as set forth.

4. The combination, with the axle, its wheels, a rearwardly-extending cross-bar, 12, and the rake-head pivoted thereto and horizontally adjustable toward and from the axle and having the teeth, of the transverse crank-shaft 46, journaled in the rear end of the cross-bar, the vertically and longitudinally rocking kicker 44, secured thereto adjacent to the tooth 24ª, and gearing operating the said shaft from one of the wheels on the axle, substantially as set forth.

5. In a hay-rake, the combination, with a rake-head, of circular plates mounted in circular recesses formed in the rake-head, standards which extend upward from the plates, and rake-teeth formed with bent ends that fit within the standards, substantially as described.

JULIUS H. BALLY.

Witnesses:
LEVI TIGHT,
ISAAC B. GABLE.